(12) United States Patent
Roy et al.

(10) Patent No.: US 9,767,085 B2
(45) Date of Patent: Sep. 19, 2017

(54) METHOD AND SYSTEM FOR CUSTOMIZATION OF RICH MEDIA

(71) Applicant: InMobi PTE LTD., Singapore (SG)

(72) Inventors: Ratul Roy, Bangalore (IN); Harish Ch Moulica, Bangalore (IN); H A Ravi Kumar, Bangalore (IN); G Punith Kumar, Bangalore (IN)

(73) Assignee: INMOBI PTE LTD., Singapore (SG)

( * ) Notice: Subject to any disclaimer, the term of this patent is extended or adjusted under 35 U.S.C. 154(b) by 107 days.

(21) Appl. No.: 14/728,158

(22) Filed: Jun. 2, 2015

(65) Prior Publication Data

US 2015/0378967 A1    Dec. 31, 2015

(30) Foreign Application Priority Data

Jun. 4, 2014  (IN) ............................ 2731/CHE/2014

(51) Int. Cl.
| | |
|---|---|
| G06F 17/00 | (2006.01) |
| G06F 17/22 | (2006.01) |
| G06F 17/30 | (2006.01) |
| G06F 9/44 | (2006.01) |
| H04L 29/08 | (2006.01) |

(52) U.S. Cl.
CPC .......... *G06F 17/227* (2013.01); *G06F 9/4443* (2013.01); *G06F 17/3089* (2013.01); *H04L 67/02* (2013.01)

(58) Field of Classification Search
CPC .................................................. G06F 17/2247
See application file for complete search history.

(56) References Cited

U.S. PATENT DOCUMENTS

| | | | |
|---|---|---|---|
| 7,802,182 B2 * | 9/2010 | Bales .................... | G06F 17/212 715/200 |
| 8,375,296 B2 | 2/2013 | Kalasapur et al. | |
| 2007/0245231 A1 * | 10/2007 | Kibler ................. | G06F 17/2205 715/234 |

(Continued)

FOREIGN PATENT DOCUMENTS

CN         103176994 A      6/2013

OTHER PUBLICATIONS

DevExtreme (R), http://phonejs.evexpress.com/, Sep. 9, 2015, 1 page.

*Primary Examiner* — Keith Bloomquist

(57) ABSTRACT

In at least one embodiment, a system and method place data on an user interface wherein the user interface is a medium for interaction between user and an internet capable device such as a web page or an application. The method and system includes extracting color information from at least one of the web page and the application. Extracting the color information includes the step of classifying each pixel of at least one of the web page and the mobile application into a cluster of a plurality of clusters. Further, the method and system includes assigning an attribute from a plurality of attributes to the cluster of the plurality of clusters. Furthermore, the method and system includes creating a plurality of Cascading Style Sheets (CSS) classes. In addition, the method and system includes customizing the data based on the plurality of CSS classes. Additionally, the method and system includes placing the data on at least one of the web page and the application.

14 Claims, 3 Drawing Sheets

(56) References Cited

U.S. PATENT DOCUMENTS

| | | | | |
|---|---|---|---|---|
| 2008/0178073 A1* | 7/2008 | Gao | ................. | G06F 17/24 |
| | | | | 715/243 |
| 2008/0313282 A1* | 12/2008 | Warila | ................. | G06F 8/24 |
| | | | | 709/206 |
| 2013/0326333 A1 | 12/2013 | Hashmi | | |
| 2014/0201623 A1* | 7/2014 | Kattner | ................. | G06F 17/218 |
| | | | | 715/235 |

* cited by examiner

METHOD AND SYSTEM FOR CUSTOMIZATION OF RICH MEDIA

FIELD OF THE INVENTION

The present invention relates to data rendering onto an user interface. In particular, the present invention relates to customizing of data rendering onto the user interface.

BACKGROUND

User interface is the space where interaction between the user and the machine occurs. Typically, the user interface is designed to make the user interaction easy, efficient and enjoyable. Interactive media is one way to render the user interface to digital computer systems which respond to user's actions by presenting text, graphics, animation, audio, video etc. Rich media, an internet advertising term for an advertisement on a web page is one of the forms of interactive media. The rich media includes at least one of text, audio, video, and a program. The user senses some change in the rich media on interacting with the rich media. For example, when the user hovers a mouse over the rich media the colour of the advertisement changes. Hence, rich media is more appealing to the user as compared to traditional advertisements. Therefore, the rich media increases the chances of user clicks. As a result, rich media is considered as a better alternative to conventional advertisements that are non-responsive to an action of the user. Hence, with the advent of time, rich media is replacing conventional advertising techniques.

However, currently available systems that push rich media advertisements into the web sites have certain limitations. One prior art describes a method and system for issuing advertising data on advertising areas. The method and system includes identifying an area on the web site. Further, the method and system includes pushing the advertisement to the identified area on the web site. The method and system has a drawback. The same advertisement is pushed to the user irrespective of the type of background of the web site. As a result, often, the colour of the web site does not blend into the colour of the advertisement. Thus, the viewing experience of the user is not very pleasant. Hence, chances of the user clicking on the advertisement is reduced.

Yet another prior art discloses a method for reusing style sheet assets. The method includes parsing a web page containing a reference to a style sheet. Further, the method includes applying a ruleset to the style sheet. Finally, the method includes deriving a layout for displaying the web page. The method lacks the ability to modify the rich media to suit the colour scheme of the web page. Hence, the colour of the web page and the colour of the rich media have a high contrast at times. As a result, the user gets an unpleasant view of the advertisement, and chances of conversion get reduced.

In light of the above discussion, there is a need for a method and a system for providing a framework to dynamically theme-up any Rich media (RM) at rim time.

BRIEF DESCRIPTION

The above-mentioned shortcomings, disadvantages and problems are addressed herein which will be understood by reading and understanding the following specification.

In various embodiments, the present invention provides a method and a system for placing data on a user interface, wherein the user interface comprises a web page, an application and the like. The method and system include extracting colour information from the user interface. Extracting the colour information includes the step of using pixel value of each pixel of the plurality of pixels of the user interface to determine level of quantization of the each pixel. Additionally, extracting the colour information includes the step of classifying each pixel of the user interface into a cluster of a plurality of clusters. Further, the method and system include assigning an attribute to the cluster. Assignment of the attribute to the cluster is based on the number of pixels contained in the cluster. Furthermore, the method and system includes creating a plurality of Cascading Style Sheets (CSS) classes. Each cluster of the plurality of clusters corresponds to a CSS class of the plurality of CSS classes. In addition, the method and system includes customizing the data based on the plurality of CSS classes. Additionally, the method and system include placing the data on the user interface.

The method includes a plurality of pre-determined clusters. Each cluster of the plurality of clusters has a counter associated with the cluster. The counter counts a number of pixels contained in the cluster.

In an embodiment, the method comprises assigning the attribute to the cluster. The assigned attribute is at least one of a primary colour cluster, a secondary colour cluster, a dominant colour cluster, an inverse colour cluster, and a moderate colour cluster.

In an embodiment, the data comprises a Document Object Model (DOM), the DOM capable of understanding the attribute assigned to the cluster.

In an embodiment, the method includes changing colour and text font of the user interface. Examples of the part include, but may not be limited to, header, body, footer, border, and combinations thereof.

In an embodiment, the method further includes modification of existing content of the user interface. The modification is aimed at increasing visibility of the data. The modification is at least one of addition of blank lines, deletion of blank lines, indentation of content of at least one of the web page and the mobile application, and aligning of the content of the user interface.

DETAILED DESCRIPTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

In the context of this description, the term 'user interface' refers to the interaction between the user and an internet capable device. Examples of user interface including but not limited to a web page and an application such as a web application, a mobile application and the like are used interchangeably throughout the specification.

Figure 1:
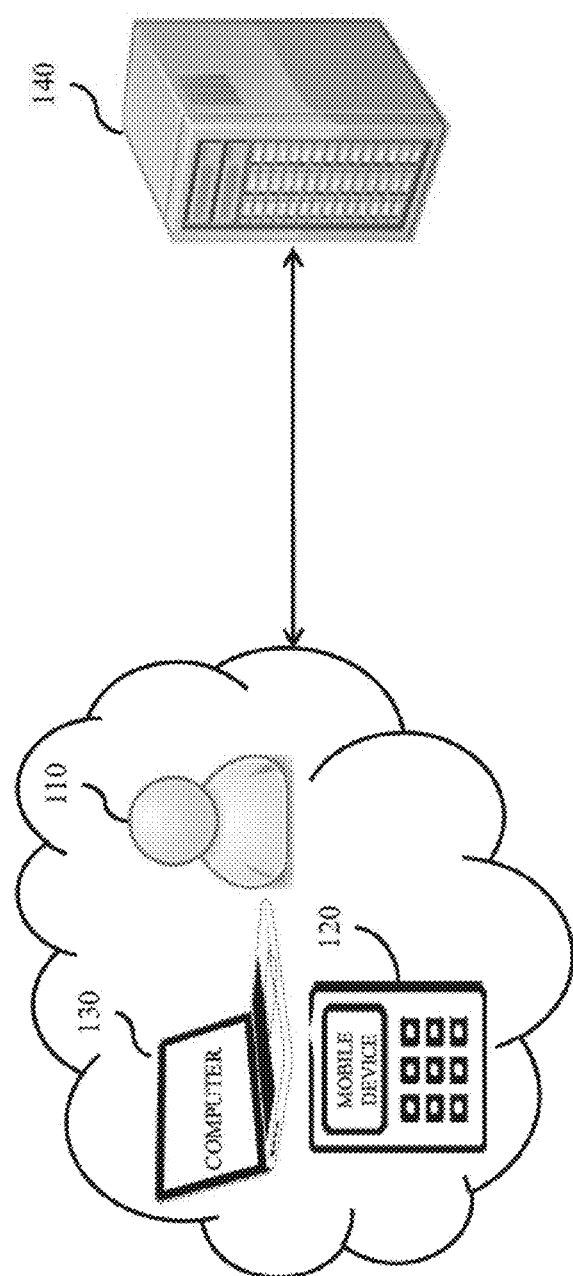
FIG. 1 illustrates a system for placing data on at least one of a web page and a mobile application, in accordance with various embodiments of the present invention.

FIG. 1 illustrates a system 100 for placing data on at least one of a web page and a mobile application, in accordance with various embodiments of the present invention. The system 100 includes a user 110. The user 110 accesses the internet to solve an objective. The objective is a personal objective, a professional objective, a social objective, a political objective, or combinations thereof. The internet is an interconnection of a plurality of devices worldwide. The Internet uses a plurality of networks to connect each device to each of the other plurality of devices. The Internet uses Internet protocol suite including Transmission Control Protocol (TCP) and Internet Protocol (IP) to link the plurality of devices. The plurality of devices are connected using wireless, electronic, and optical networking technologies. The Internet provides a host of services, which include, but are not limited to, sharing of a vast range of documents and applications, access to the World Wide Web (WWW), peer-to-peer networks, and Internet telephony. The user 110 uses at least one of a internet capable device 120 and 130 to access the Internet.

The internet capable device 120 refers to a handheld electronic device that is used to communicate over a communication network. Examples of the interne capable device 120 are a cell phone, a personal digital assistant (PDA), a wireless email terminal, a tablet computer, and the like. Examples of the communication network are a local area network, a wide area network, a wireless network, a telecommunication network, and the like. Types of the telecommunication network include but may not be limited to a global system for mobile communication (GSM) network, a general packet radio service (GPRS) network, a code division multiple access (CDMA) network, enhanced data GSM environment (EDGE), wideband CDMA (WCDMA), and the like.

With the advent of technology, the internet capable device 120 has become capable of providing the user 110 access to the Internet. The user 110 uses the internet capable device 120 to access the Internet using mobile web browser. Alternatively, the user 110 uses the internet capable device 120 to access the Internet using at least one mobile application installed on the internet capable device 120 of the user 110. The mobile web browser and the at least one mobile application provide the user 110 with a range of information and data, as and when desired by the user 110. Simultaneously, an Internet Service Provider (ISP) uses a database of the user 110 to understand likes and dislikes of the user 110. Based on the likes and dislikes, a sponsored resource is sent to the user 110 in the future.

The internet capable device 130 refers to a general-purpose computing device. The general-purpose computing device receives information or data in a particular form. Further, the general-purpose computing device performs at least one operation on the received information or data. Nature of the operation to be performed is determined in a plurality of ways.

In an embodiment, the nature of the operation performed is determined manually. In another embodiment, the nature of the operation performed is automatically determined based on the type of data received. In yet another embodiment, the nature of the operation performed is determined based on a pre-programmed algorithm. The pre-programmed algorithm performs different operations on the same information or data at different instants of time. Subsequently, the general-purpose computing device gives a result. The result is generally in accordance with the information or data. Further, the result is obtained upon at least one operation on the received information or data. Examples of the internet capable device 130 include, but may not be limited to, a desktop computer, a laptop computer, a mainframe computer, a super computer, and a mini computer.

Advantages of the internet capable device 130 include speed of processing the data, precision in processing the data, compactness of the infrastructure required to process the data, and reduction in manpower required to process the data. Additionally, the user 110 uses the internet capable device 130 as a medium to browse the Internet. A web browser present in the internet capable device 130 facilitates browsing of the Internet. With the advent in use of the Internet, the Internet has widely grown as a place for various entities to interact with each other. The various entities exchange information and data in the course of interaction. The ISP leverages this exchange of information and data to understand browsing patterns of the user 110. The ISP uses the browsing pattern to send sponsored resources to the user 110 in the future.

At least one of the internet capable device 120 and the internet capable device 130 interact with a web server 140. The web server 140 stores a plurality of advertisements. The web server 140 sends the data to at least one of the interne capable device 120 and the internet capable device 130 on receiving a request from the user 110. For example, the web server 140 sends data to at least one of the internet capable device 120 and the internet capable device 130 on receiving the request from the user 110. In an embodiment, the request is in the form of uniform resource locator (URL). The URL is a formatted text string used by Web browsers, email clients and other software to identify a network resource on the Internet. Examples of the network resources include, but may not be limited to, files in at least one of plain web pages, text documents, graphics, and program format.

In the course of description, the web browser, the mobile web browser, and the mobile application are collectively treated as a web surfing interface. Hence, the terms web browser, mobile application and web surfing interface are used alternatively. The web surfing interface in an interface between the user 110 and backend of at least one of the internet capable device 120 and the computer 130. The web surfing interface receives at least one input from the user 110 and communicates the at least one input to the backend of at least one of the internet capable device 120 and the computer 130. Further, the web surfing interface displays an output from the backend of at least one of the internet capable device 120 and 130 to the display unit of at least of the internet capable device 120 and 130.

Figure 2:
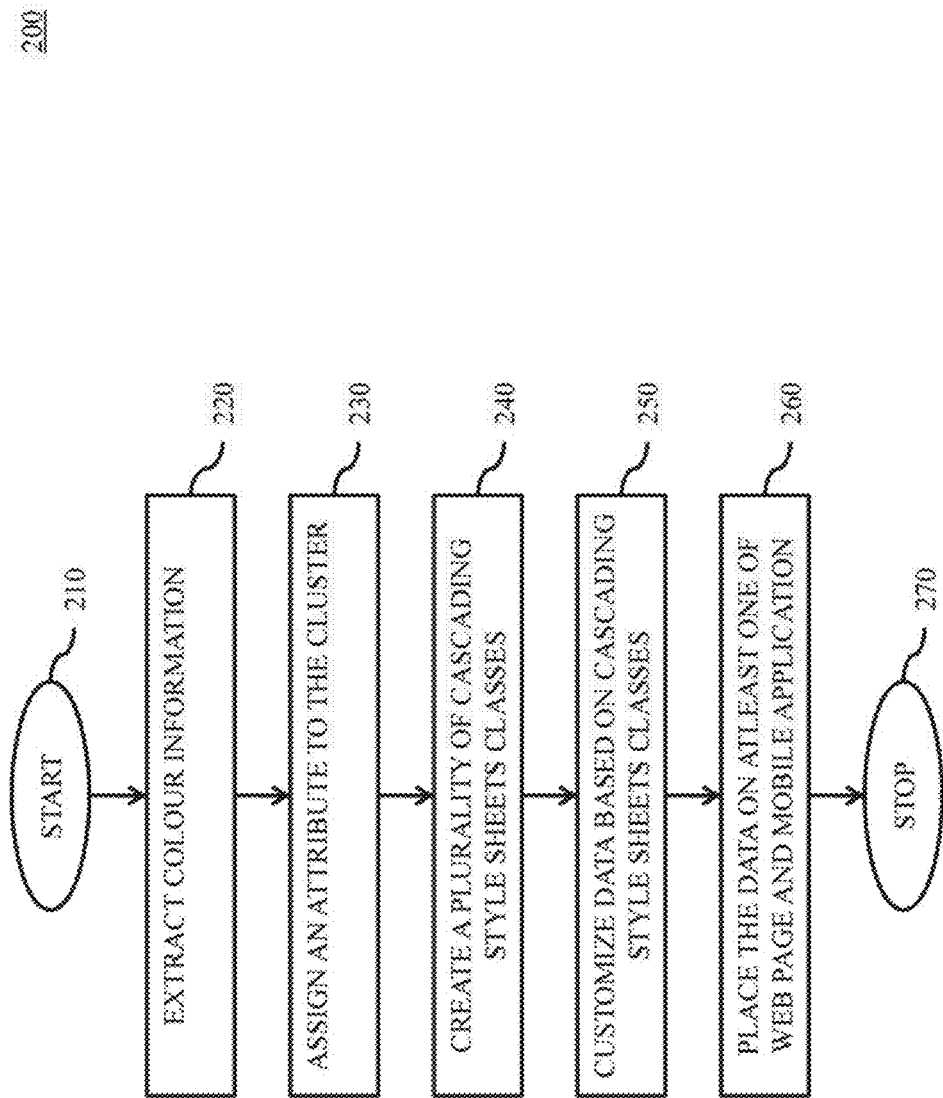
FIG. 2 illustrates a flowchart for placing data on at least one of the web page and the mobile application, in accordance with various embodiments of the present invention.

FIG. 2 illustrates a flowchart 200 for placing data on at least one of the web page and the mobile application, in accordance with various embodiments of the present invention. As described above, the web page and the mobile application are collectively called web surfing interface.

At step 210, the flowchart 200 initiates. At step 220, a data management system installed on at least one of the interne capable device 120 and the internet capable device 130 extracts colour information from the web surfing interface. The colour information is information about the range and intensity of the colours present in the web surfing interface.

The user 110 uses the web surfing interface to request the web page that the user 110 wishes to view. The web server 140 sends the requested web page to the interne capable device 120. Alternately, the web server 140 sends the requested web page to the interact capable device 130. The data management system parses the web page. Subsequently, the data management system uses a pixel value of each pixel of the plurality of pixels of at least one of the web page and the mobile application to determine level of quantization of the each pixel. Further, the data management system uses the level of quantization of each pixel to classify each of the pixel of the web surfing interface into a cluster of a plurality of clusters.

The plurality of clusters exist in the data management system. Additionally, the plurality of clusters is created based on the colour range of the web surfing interface. For example, the level of quantization of each pixel of the plurality of pixels is in the range of 0 to 255, taking the number of levels of quantization to 256. The 256 levels of quantization are sub-divided into eight clusters. Each cluster of the eight clusters has 32 levels of quantization. The first cluster has quantization levels ranging from 0 to 31. The second cluster has quantization levels ranging from 32 to 63. Accordingly, levels of quantization for clusters 3 to 8 are determined.

The cluster for each pixel is determined based on the pixel value of each pixel. For example, a pixel with pixel value of 40 is clustered into the second cluster. Similarly, each pixel of the plurality of pixels is clustered into one cluster of the plurality of clusters.

Each cluster of the plurality of clusters has a counter associated with the cluster. The counter counts the number of pixels, which belong to each cluster of the plurality of clusters. Generally, each cluster of the plurality of clusters has a different counter value. For example, the counter value for the first cluster is 200. The counter value of the second cluster is 500. The counter value for the first cluster is 400. Accordingly, each cluster has a unique counter value associated with the each cluster.

At step 230, the data management system assigns an attribute from a plurality of attributes to the each cluster of the plurality of clusters. The plurality of attributes include, but may not be limited to, a primary colour cluster, a secondary colour cluster, a dominant colour cluster, an inverse colour cluster, and a moderate colour cluster. The assignment of the attribute to the each cluster is based on the number of pixels contained in the cluster. As explained above, the data management system determined the number of pixels contained in the each cluster based on the value of the counter associated with the each cluster.

In an embodiment, the cluster with highest counter value is attributed as the dominant colour cluster. Similarly, the data management system assigns other attributes to the other clusters.

In another embodiment, the first cluster with quantization levels from 0 to 31 is attributed as the dark cluster. Further, the cluster with quantization levels from 223 to 255 is attributed as the dark cluster.

At step 240, the data management system creates a plurality of Cascading Style Sheets (CSS) classes. The plurality of CSS classes are based on the plurality of clusters. For example, the cluster with the highest counter value gets mapped to the primary CSS class. The cluster with the secondary cluster value gets mapped to the secondary CSS class.

In an embodiment, the data management system eliminates the cluster with low counter value. In another embodiment, the data management system uses the clusters with low counter value to map onto minimum areas of data to be rendered. In yet another embodiment, each cluster maps onto a CSS class. The prominence of the CSS class is based on certain other factors. The other factors include, but may not be limited to, time of the day, location of the user 110, favourite colours of the user 110, and browsing habits of the user 110.

At step 250, the data management system customizes the data to be placed on the website based on the CSS classes. Additionally, the data management system appends the data to Document Object Model (DOM).

At step 260, the data management system places the data on at least one of the web page and the mobile application. The data management system customizes the data to be before placing on at least one of the web page and the mobile application. The modification is based on the data management system appending the data to the DOM. At step 270, the flowchart terminates.

Figure 3:
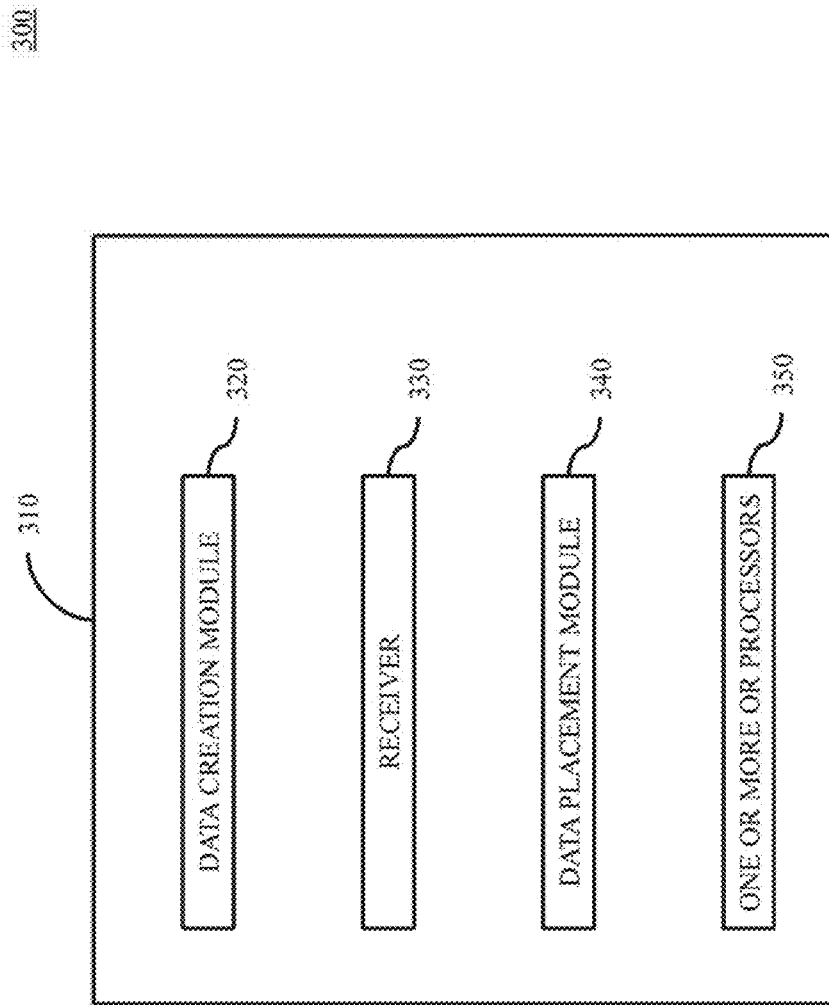
FIG. 3 illustrates a block diagram of a system for placing data on at least one of the web page and the mobile application, in accordance with various embodiments of the present invention.

FIG. 3 illustrates a block diagram 300 of a system 310 for placing data on at least one of the web page and the mobile application, in accordance with various embodiments of the present invention. The system 310 includes a data creation module 320. The data creation module creates a plurality of Cascading Style Sheets (CSS) classes. As explained above, each cluster of the plurality of clusters corresponds to a CSS class of the plurality of CSS classes.

Further, the system 310 includes a receiver 330. The receiver 330 receives at least one of the web page and the mobile application from the web server 140. As explained above, at least one of the web page and the mobile application is parsed and analyzed to determine the colour information of at least one of the web page and the mobile application. In addition, the receiver receives the data to be placed on at least one of the web page and the mobile application. The data to be placed is modified based on the analysis of at least one of the web page and the mobile application.

Furthermore, the system includes a data placement module 340. The data placement module 340 places data on at least one of the web page and the mobile application. The data is placed upon modifying the data based on the plurality of CSS classes.

Additionally, the system 310 includes one or more processors 350. The one or more processors 350 extract colour information from at least one of the web page and the mobile application. As explained above, the one or more processors 350 extract colour information using pixel value of each pixel of the plurality of pixels of at least one of the web page and the mobile application. Additionally, the one or more processors 350 classify each of the pixel in a cluster of the plurality of clusters. The process of clustering each pixel is explained above in detail.

In addition, the one or more processors 350 assign an attribute to each cluster. As explained above, the assignment of attribute to each cluster is based on the number of pixels contained in the each cluster.

Further, the system 310 includes a storage module. The storage module stores the data to be placed on at least one of the web page and the mobile application. In addition, the storage module stores the pixel count of each cluster of the plurality of clusters. Further, the storage module stores the web page before rendering the web page onto the display element of the internet capable device 120 and the internet capable device 130.

The system and method serves advertisements onto at least one of the web page and the mobile application. The served advertisement is modified before serving. The modification increases visibility of the advertisement. Generally, the modification adds features to the advertisement which in turn increases click ratio of the advertisements. For example, the modification enables hover feature over the advertisement. This in turn brings the advertisement to the notice of the viewer. Thus, chances of the user clicking the advertisement are more. In addition, the system and method allow advertisements to be placed in the mobile applications. Such advertisements are reframed to match the colour scheme of the mobile application. Thus, the advertisement becomes soothing for the viewer to view at, thereby again increasing chances of the viewer clicking onto the advertisement.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for placing data on a user interface to be rendered of at least one member of a web page and an application, the method comprising:
    performing with code in a memory executing by a processor of a computer system to transform the computer system into a machine:
        extracting color information from the user interface to be rendered, wherein each user interface comprises a plurality of pixels, and wherein the extracting step comprises:
            for each pixel in the user interface, using a pixel value of the pixel to determine a level of quantization of the pixel; and
            classifying the pixel, in accordance with one of a plurality of levels of quantization of the pixel, into a cluster of a plurality of clusters, wherein each cluster represents at least one property of the plurality of the levels of quantization;
        for each cluster of the plurality of clusters, assigning an attribute from a plurality of attributes to the cluster, wherein assignment of the attribute to the cluster is based on a number of pixels contained in the cluster;
        creating a plurality of Cascading Style Sheets (CSS) classes, wherein each cluster of the plurality of clusters corresponds to a CSS class of the plurality of CSS classes;
        customizing the data based on the plurality of CSS classes; and
        placing the customized data on the user interface.

2. The method as claimed in claim 1, wherein each cluster of the plurality of clusters has a counter associated with the cluster and the counter represents a number of pixels contained in the cluster.

3. The method as claimed in claim 1, the method further comprising:
    determining a number of the plurality of CSS classes; and
    storing the plurality of CSS classes in a local cache when the number of the CSS classes is larger than a pre-determined threshold, wherein the pre-determined threshold is altered based on a size of the local cache.

4. The method as claimed in claim 1, wherein the attribute assigned to each cluster includes at least one member of a group consisting of: a primary color cluster, a secondary color cluster, a dominant color cluster, an inverse color cluster, and a moderate color cluster.

5. The method as claimed in claim 1, wherein each cluster of the plurality of clusters comprises a pre-determined range of the quantization levels.

6. The method as claimed in claim 1, wherein the data comprises a Document Object Model (DOM) and the DOM is capable of understanding the attribute assigned to each of the clusters.

7. The method as claimed in claim 1, further comprising:
    changing color and text font of the clusters of pixels of media in the user interface to suit a color and text font of at least a part of at least one of (i) the web page and (ii) the application, the part comprising a header, a body, a footer, a border, and combinations thereof.

8. The method as claimed in claim 1, the method comprising modifying an existing content of at least one of the web page and the application, wherein the modifying increases visibility of the data.

9. The method as claimed in claim 8, wherein the modifying comprises at least one member of a group consisting of:
    adding a plurality of blank lines;
    deleting a plurality of blank lines;
    indenting content of at least one of the web page and the application; and
    aligning of the content of the at least one of the web page and the application.

10. The method as claimed in claim 1, the method comprising editing the data during run time, wherein editing the data dynamically modifies the data.

11. The method as claimed in claim 10, wherein dynamic modification of the data comprises at least one member of a group consisting of::
    modifying the data during run time;
    modifying the customized data based on a pre-determined color scheme; and
    modifying the data based on certain parameters.

12. The method as claimed in claim 11, wherein the certain parameters comprise at least one of a time of the day, a location of a viewer of the data, and favorite colors of the viewer of the data.

13. A system for placing data on a user interface to be rendered of at least one member of a web page and an application, the system comprising:
    a receiver, wherein the receiver is configured to:
        receive the user interface to be rendered;
        receive data to be placed on the user interface;
    one or more processors, wherein the one or more processors are configured to:
        extract color information from the user interface to be rendered, the extraction of color information comprising:
            for each pixel in the user interface, use a pixel value of the pixel to determine a level of quantization of the pixel; and
            the pixel, in accordance with one of a plurality of levels of quantization of the pixel, into a cluster of a plurality of clusters, wherein each cluster represents at least one property of the plurality of the levels of quantization;
    a data creation module, the data creation module configured to:
        for each cluster of the plurality of clusters, assign an attribute from a plurality of attributes to the cluster, wherein assignment of the attribute to the cluster is based on a number of pixels contained in the cluster;

create a plurality of Cascading Style Sheets (CSS) classes, wherein each cluster of the plurality of clusters corresponds to a CSS class of the plurality of CSS classes; and a data placement module, wherein the data placement module is configured to:

customize the data based on the plurality of CSS classes; and place the customized data on the user interface to be rendered.

14. The system as claimed in claim 13, the system comprising a storage module, the storage module configured to store the data to be placed on the user interface.

* * * * *